United States Patent
Al-Atat et al.

(10) Patent No.: US 10,333,297 B2
(45) Date of Patent: Jun. 25, 2019

(54) ENERGY COMBINER FOR HYDRAULIC CIRCUIT SENSOR

(71) Applicant: EATON INTELLIGENT POWER LIMITED, Dublin (IE)

(72) Inventors: Hassan Al-Atat, Lakeville, MN (US); Nilesh Kailasrao Surase, Maharashtra (IN); Pradeep Gokuldasji Bhutada, Maharashtra (IN)

(73) Assignee: Eaton Intelligent Power Limited (IE)

( * ) Notice: Subject to any disclaimer, the term of this patent is extended or adjusted under 35 U.S.C. 154(b) by 346 days.

(21) Appl. No.: 15/036,725

(22) PCT Filed: Nov. 7, 2014

(86) PCT No.: PCT/US2014/064632
§ 371 (c)(1),
(2) Date: May 13, 2016

(87) PCT Pub. No.: WO2015/073325
PCT Pub. Date: May 21, 2015

(65) Prior Publication Data
US 2016/0294184 A1    Oct. 6, 2016

Related U.S. Application Data

(60) Provisional application No. 61/904,240, filed on Nov. 14, 2013.

(51) Int. Cl.
*H02J 1/10* (2006.01)
*H02J 7/34* (2006.01)
*F15B 15/10* (2006.01)

(52) U.S. Cl.
CPC ............... *H02J 1/10* (2013.01); *F15B 15/10* (2013.01); *H02J 7/34* (2013.01); *H02J 1/108* (2013.01)

(58) Field of Classification Search
CPC ..... H02J 1/10; H02J 7/34; H02J 1/108; F15B 15/10
See application file for complete search history.

(56) References Cited

U.S. PATENT DOCUMENTS 4,812,672 A * 3/1989 Cowan ................... H02J 9/061
307/43
7,555,936 B2    7/2009 Deckard
(Continued)

FOREIGN PATENT DOCUMENTS

| JP | 08-122109 A | 5/1996 |
|----|-------------|--------|
| JP | 10-031525 A | 2/1998 |
| JP | 2011-078274 A | 4/2011 |

OTHER PUBLICATIONS

International Search Report for corresponding International Patent Application No. PCT/US2014064632 dated Feb. 25, 2015.
(Continued)

*Primary Examiner* — Jared Fureman
*Assistant Examiner* — Michael J Warmflash
(74) *Attorney, Agent, or Firm* — Merchant & Gould P.C.

(57) ABSTRACT

A hydraulic system includes a hydraulic circuit with a hydraulic component. A sensor is provided for sensing a characteristic of the hydraulic component. An energy harvester is configured to harvest energy from the hydraulic circuit. An energy combiner receives power outputs from the energy harvester and a battery, and is configured to selectively power the sensor from at least one of the battery and the energy harvester in response to a predetermined condition.

17 Claims, 6 Drawing Sheets

(56) References Cited

U.S. PATENT DOCUMENTS

| | | | |
|---|---|---|---|
| 2006/0196252 A1 | 9/2006 | Deckard | |
| 2010/0066431 A1* | 3/2010 | Carter | H02J 1/10 327/408 |
| 2010/0174495 A1* | 7/2010 | Pereira | F16L 11/127 702/34 |
| 2011/0121653 A1* | 5/2011 | Hartular | H02J 1/10 307/66 |
| 2012/0032518 A1* | 2/2012 | Huang | H02J 1/10 307/81 |

OTHER PUBLICATIONS

Extended European Search Report for corresponding European Patent Application No. 14862731.8 dated Jun. 13, 2017, 7 pages.

\* cited by examiner

ENERGY COMBINER FOR HYDRAULIC CIRCUIT SENSOR

CROSS-REFERENCE TO RELATED APPLICATION(S)

This application is a National Stage of PCT/US2014/064632, filed on Nov. 7, 2014, which claims benefit of U.S. patent application Ser. No. 61/904,240 filed on Nov. 14, 2013 and which applications are incorporated herein by reference. To the extent appropriate, a claim of priority is made to each of the above disclosed applications.

BACKGROUND

The present disclosure relates generally to energy combiner systems for selecting or combining power from multiple power sources.

Certain electronic components and systems are powered using a combination of power sources. For example, some low power systems are employed in situations where a directly wired source of power is inconvenient or even impossible. Such systems are thus often battery-powered. However, in many implementations the battery to be used must have a small form factor (e.g., coin-sized, or AA-size or less). These batteries generally have limited life spans, particularly when exposed to extreme environmental conditions.

Hydraulic systems include various hydraulic components such as pumps, motors, valves, actuators, hoses, etc. These hydraulic components can be prone to degradation and failures over time. It is therefore desirable to provide a sensor system for monitoring the health and performance of the various hydraulic components and/or the system as a whole.

For example, high pressure reinforced hydraulic hose is typically used on a variety of fluid power operated machines, such as earth-moving machines, to provide a flexible connection between several moving parts of a hydraulic circuit employed on or within the machine. Such hoses may include a hollow polymeric inner tube on which successive cylindrical layers of reinforcing material, such as wire or textile, are concentrically applied to contain the radial and axial pressures developed within the inner tube.

Many applications are demanding hose constructions with both high burst strength and long term fatigue resistance. Using conventional technology, the burst strength of a hose design may be increased by adding additional reinforcing material and/or layers, a practice which h generally discouraged because of its negative impact on the flexibility of the hose, or by universally increasing the tensile strength of each layer of reinforcement material, which may come at the expense of hose fatigue resistance.

To determine the robustness of a hose design, a hose manufacturer typically performs, among other tests, an impulse test and a burst test on the hose. An impulse test measures a hose designs resistance to fatigue failure by cyclically subjecting the hose to hydraulic pressure. A burst test, on the other hand, is a destructive hydraulic test employed to determine the ultimate strength of a hose by uniformly increasing internal pressure until failure. Based on these and other tests, a manufacturer can estimate a hose life that can be used to determine when a hose has reached the end of its life and may require replacing.

In some circumstances, it is desirable to detect, in a non-destructive and non-disruptive manner a likelihood of failure of a hydraulic hose. One solution providing this capability is discussed in U.S. Pat. No. 7,555,936, and discloses connecting a monitor circuit between two parallel, at least partially-conductive layers of a hose wall. A change in an electrical property observed by that monitor circuit may indicate a change in a property of the hose wall structure that might indicate impending failure of the hose wall.

To determine whether changes in electrical properties of a hose assembly have occurred, an electrical circuit is applied to the conductive layers of the hose wall. The results of testing such an electrical property (e.g., resistance) can be stored and/or communicated by the electrical circuit to a monitor remote from that electrical circuit. For example, when used in the context of a fluid power operated machine, a monitor can be located in a cab or other area where an operator can readily assess status of such hoses.

Because industries are increasingly centralizing controls of hydraulic systems to meet customer requirements in terms of compactness, as well as ease of use and maintenance, the electrical circuits positioned on hoses positioned away from the cab will not have a convenient, directly wired source of power. Accordingly, the electrical circuits used to monitor hose degradation are typically battery-powered. To prolong battery life, some systems further employ energy harvesters configured to harvest energy from the hydraulic system in addition for powering such electrical circuits.

Improvements in such systems are desired.

SUMMARY

In accordance with aspects of the present disclosure, a hydraulic system includes a hydraulic circuit with a hydraulic component. A sensor is provided for sensing a characteristic of the hydraulic component. An energy harvester is configured to harvest energy from the hydraulic circuit. An energy combiner receives power outputs from the energy harvester and a battery, and is configured to selectively power the sensor from at least one of the battery and the energy harvester in response to a predetermined condition. For example, the energy combiner may be configured to power the sensor from the battery alone in response to the output of the energy harvester being below a first predetermined level, from the battery and the energy harvester together in response to the output of the energy harvester being below a second predetermined level that is higher than the first predetermined level, and from the energy harvester alone in response to the output of the energy harvester being at or above the second predetermined level.

In accordance with further aspects of the disclosure, a hose assembly includes a hose having a first conductive layer and a second conductive layer. A sensor is in electrical communication with the first and second conductive layers, and an energy harvester is in electrical communication with the sensor. A battery is also in electrical communication with the sensor. An energy combiner receives power outputs from the energy harvester and the battery, and is configured to selectively power the sensor from at least one of the battery and the energy harvester in response to a predetermined condition.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

In general this disclosure relates to an energy combiner for providing power to a sensor for monitoring hydraulic systems. Hydraulic systems often operate in harsh conditions and thus, the hydraulic components can be prone to degradation and failures over lime. High pressure reinforced hydraulic hose is typically used on a variety of fluid power operated machines, such as earth-moving machines, to provide a flexible connection between several moving parts of a hydraulic circuit employed on or within the machine. Such hoses may include a hollow polymeric inner tube on which successive cylindrical layers of reinforcing material, such as wire or textile, are concentrically applied to contain the radial and axial pressures developed within the inner tube.

Many applications are demanding hose constructions with both high burst strength and long term fatigue resistance. Using conventional technology, the burst strength of a hose design may be increased by adding additional reinforcing material and/or layers, a practice which is generally discouraged because of its negative impact on the flexibility of the hose, or by universally increasing the tensile strength of each layer of reinforcement material, which may come at the expense of hose fatigue resistance.

It is therefore desirable to provide sensors for monitoring the health and performance of the various hydraulic hoses and other components, and/or the system as a whole. Such sensors are typically positioned in such a manner to make wired power sources inconvenient or even impossible. Battery-powered sensors have a number of challenges. For example, due to the need for a small-sized package, generally the battery to be used must have a small form factor. These batteries generally have limited life spans, particularly when exposed to extreme environmental conditions (for example, temperature ranges of −40 to 125° C.). Additionally, using batteries in applications where a hydraulic hose is difficult to reach causes difficulties, because then battery changes and other maintenance tasks become difficult. Accordingly, it is desirable to reduce an amount of maintenance that would be required of a monitoring circuit.

An energy harvester can be used to convert energy from the hydraulic system to electrical power for sensors of a monitoring system. However, there can be periods where the energy harvester provides insufficient power. A rechargeable or non-rechargeable battery can be used in conjunction with an energy harvester to power sensors, though power management of the combination of battery and energy harvester power can be difficult. For instance, it is desirable to minimize the battery usage to extend the battery life, thus reducing maintenance requirements.

In accordance with certain aspects of the present disclosure, an energy combiner is provided that combines generated energy from one or more energy harvesters and battery energy to power a sensor. Energy consumption of the disclosed energy combiners is be minimal so as to minimize energy loss between generated energy and the energy sourced to a sensor or other device to be powered.

Figure 1:
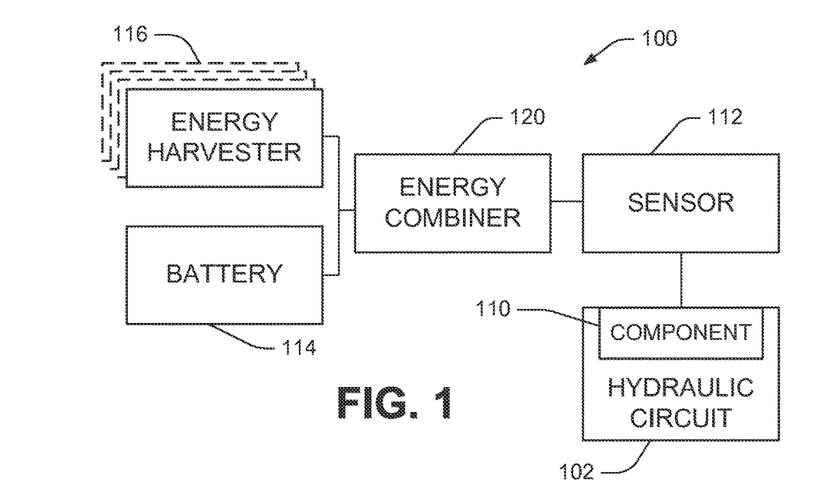
FIG. 1 is a block diagram conceptually illustrating an example of a hydraulic system in accordance with aspects of the present disclosure.

FIG. 1 conceptually illustrates an example of hydraulic system 100 that includes such an energy combiner. The hydraulic system 100 includes a hydraulic circuit 102 having one or more hydraulic components 110. A sensor 112 is configured to sense a. characteristic of the hydraulic component 110 or circuit 102. A battery 114 is provided, as well as an energy harvester 116 that is configured to harvest energy from the hydraulic circuit 110. In some examples, several energy harvesters 116 are provided. Various types of harvesters can be used, such as a thermal energy harvester, piezo electric energy harvester, RF energy harvester, electrostatic energy harvester, etc. In this manner, energy from different aspects of the hydraulic circuit 102 can be harvested.

An energy combiner 120 receives power outputs from the energy harvester 116 and the battery 114, and is configured to selectively power the sensor 112 from at least one of the battery 114 and the energy harvester 116 in response to a predetermined condition. In some implementations, the energy combiner 120 is configured to power the sensor 112 from the battery 114 alone in response to a first condition, from the energy harvester 116 alone in response to a second condition, and from the energy harvester 116 and the battery 114 together in response to a third condition. In some embodiments, the predetermined condition is the output of the energy harvester 112, and the devices used to power the sensor 112 are determined in response to various predetermined output levels of the energy harvester 112. In general, if the energy output by the energy harvester 116 is insufficient to power the sensor 112, it is powered by the battery 114 alone. If the energy output by the energy harvester 116 is sufficient to power the sensor 112 but not sufficient to provide an increased power level required for a sensor 112 start-up condition, it is powered by the battery 114 and energy harvester 116 together. If the energy output by the energy harvester 116 is sufficient to start up and power the sensor 112, it is powered by the energy harvester 116 alone.

Figure 2:
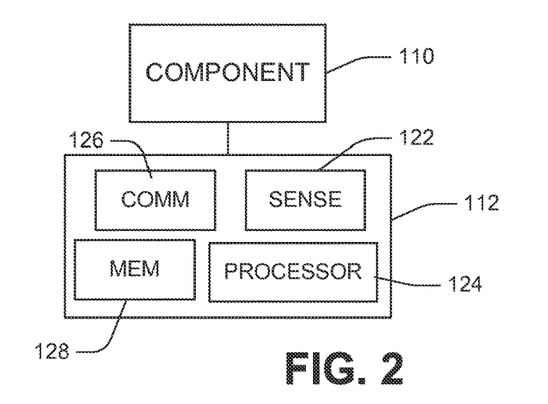
FIG. 2 is a block diagram further illustrating an example of a sensor shown in FIG. 1

As noted above, when the energy combiner is employed to power a sensor 112 for monitoring aspects of a hydraulic circuit 102 as shown in FIG. 1. The component 110 could be a hydraulic component such as a hydraulic hose, pump, motor, etc. Referring to FIG. 2, the sensor 112 in some implementations includes sensing block 122 for sensing the desired parameter. A processor 124 is configured to control various aspects of the sensor 112, including a communications block 126 providing communications (typically wireless) with external devices, operator interfaces such as a display, etc. The processor 124 could be implemented by one or more discrete modules (or data processing components) that are not limited to any particular hardware, firmware, or software configuration. In the illustrated embodiments, the processor 124 and associated functions of the sensor 112 may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions e.g., machine-readable code, such as computer software) for implementing the methods that are executed by the processor 124, as well as the data generated, are stored in one or more machine-readable media 128. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 3:
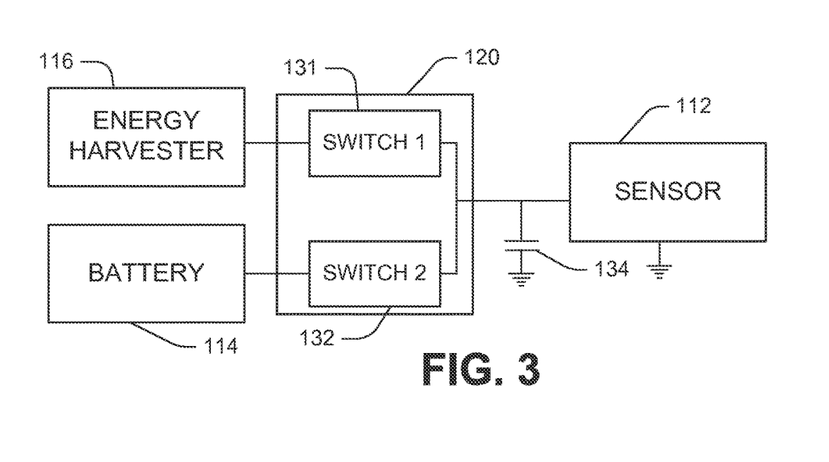
FIG. 3 is a block diagram illustrating an example of an energy combiner sensor shown in FIG. 1

FIG. 3 is a block diagram illustrating further aspects of the system 100. The example energy combiner 120 shown in FIG. 3 includes a first switch 131 connected between an output terminal of the energy harvester 116 and an input terminal of the sensor 112, and a second switch 132 connected between an output terminal of the battery 114 and the sensor 112. A transition capacitor 134 is connected between the energy combiner 120 and the sensor 112 that is charged by the output of the energy combiner to provide a transition voltage to the sensor 112 to be used when increased power is required, such as during start-up of the sensor 112.

Figure 4:
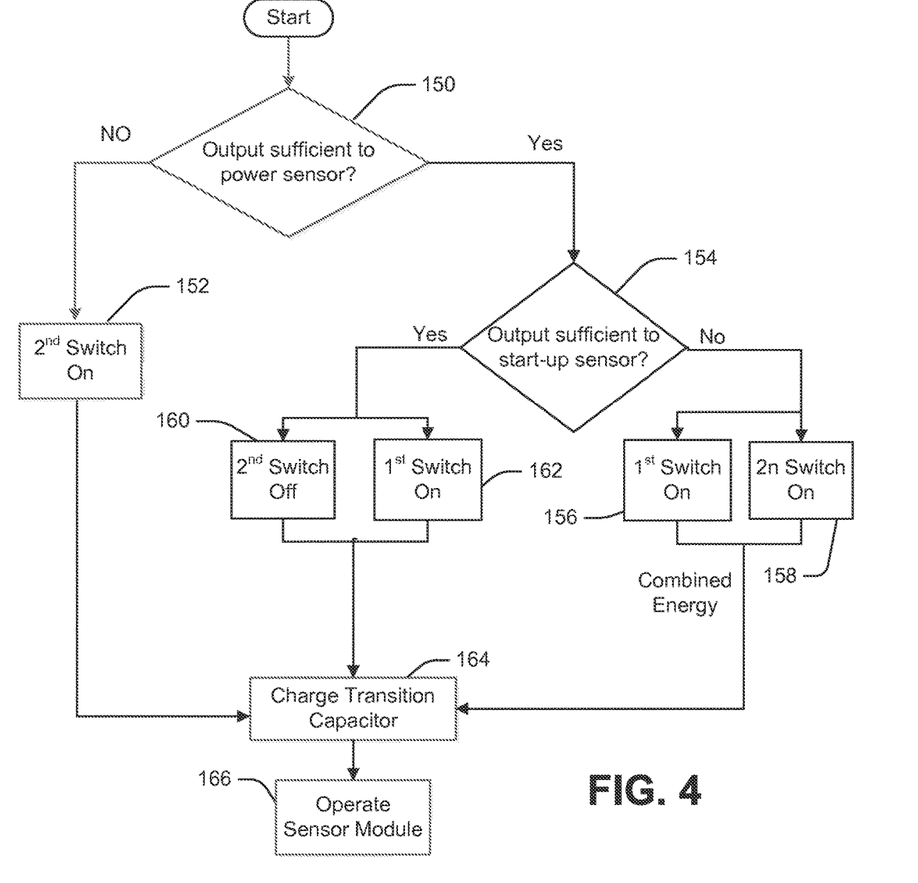
FIG. 4 is a flow diagram illustrating an example of a process for powering a sensor in accordance with aspects of the present disclosure.

FIG. 4 is a flow diagram illustrating and example of the operation process of the energy combiner 120. The output of the energy harvester 116 is checked in a decision block 150, and if the output is not sufficient to power the sensor 112 (below a first predetermined power level), the second switch 132 is turned on in block 152 so that the energy combiner 120 is configured to power the sensor 112 from the battery alone.

In some examples, the processor 124 goes into a "sleep" mode during down periods. A power level that exceeds the normal operating power requirement is required for start-up of the processor 124. Thus, if the decision block 150 returns a "yes"—it determines that the output of the energy harvester 116 is above the first predetermined level (sufficient to power the sensor 112)—the energy harvester output is further checked in a decision block 154 to determine whether the energy harvester output is sufficient to power on or start up the sensor 112. If the decision block 154 returns a "no"—it determines that the below a second predetermined level (start-up voltage)—both switches 131,132 are turned on in blocks 156, 158 such that the sensor 112 is powered from the battery 114 and the energy harvester 116 together.

If decision block 154 determines that the output of the energy harvester 116 is sufficient to stall-up the sensor 112 (above the second predetermined level), then the second switch 132 is turned off in block 160 and the first switch 131 is turned on in block 162 so that the sensor 112 is powered from the energy harvester 116 alone. As noted above, the output of the energy combiner 120 charges the transition capacitor (block 164) in addition to providing power to operate the sensor 112 (block 166) in some embodiments.

Figure 5:
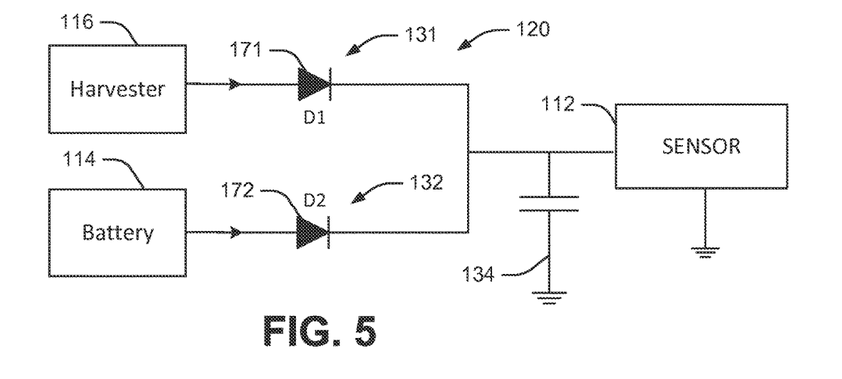
FIG. 5-9 are schematic diagrams illustrating various examples of energy combiners in accordance with aspects of the present disclosure.

FIG. 5 illustrates an example of the energy combiner 120 in which the first and second switches 131, 132 consist of respective first and second diodes 171,172. In some examples, the diodes 171,172 are Schottky diodes. The energy combiner 120 shown in FIG. 5 operates based on the forward voltage of the diodes 171,172 (minimum voltage needed to turn the diode on) and the P-N junction resistance. The diode having the lower forward voltage conducts first to start sourcing energy to the sensor 112. Thus, the energy combiner 120 shown in FIG. 5 is configured so that the diode having the lower forward voltage is connected as the first, or energy harvester switch 131. Thus, whenever sufficient energy is available from the energy harvester 116, the first diode 171 will go in to conduction and provide energy to the sensor 112. If the output of the energy harvester 116 is insufficient to power on or start up the sensor 112, the diode 172 goes into conduction and provides energy to the sensor 112.

The diodes 171, 172 are configured such hat the voltage output to the sensor 112 from the energy combiner remains essentially continuous within a desired operating voltage range of the sensor 112, which is 2.8 to 3.6 volts in one embodiment. The embodiment illustrated in FIG. 5 is simple, only requiring the two diodes 171,172, resulting in a low cost and small sized energy combiner 120 with a relatively low power loss across the two diodes 171,172 when the sensor 112 turns on.

Figure 6:
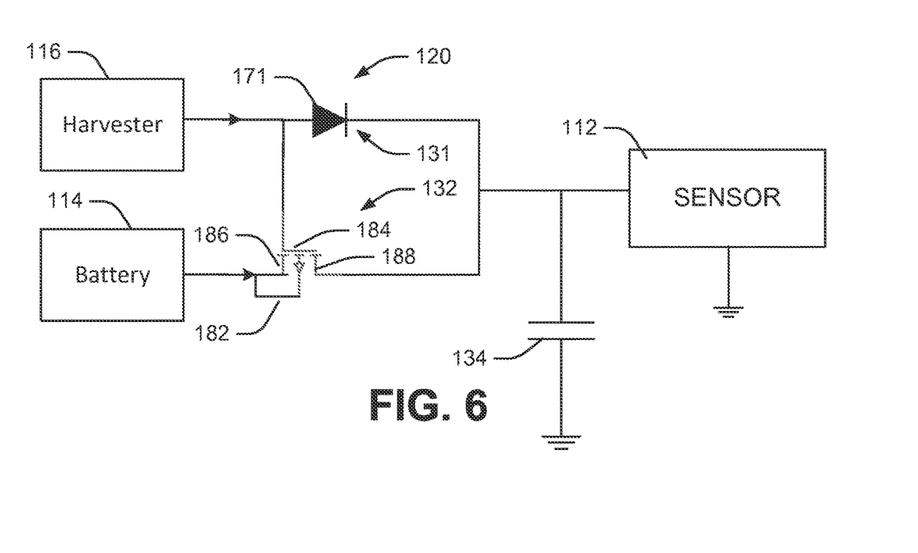

FIG. 6 illustrates another example of the energy combiner 120 where the first switch 131 includes a diode 171 with its anode connected to the output terminal of the energy harvester 116 and its cathode connected to the sensor 112. The second switch 132 includes a transistor 182 having a gate terminal 184 connected to the output terminal of the energy harvester 116, a source terminal 186 connected to the output terminal of the battery, and a drain terminal 188 connected to the sensor 112. In the example shown in FIG. 6, the transistor 182 is a P-MOSFET.

When the diode 171 conducts (the energy harvester 116 output is sufficient to turn on the diode 171), the transistor 182 turns off so that the energy harvester 116 provides energy to the sensor 112. When the output of the energy harvester 116 is below the first predetermined level (inadequate to power the sensor 112), the diode 171 turns off, which turns on the transistor 182 due to the zero gate bias so that the battery 114 provides energy to the sensor 112. The P-MSOFET 182 is selected in the illustrated example such that the source-drain resistance $R_{ds}$ (in ON condition) is as low as possible. The transition capacitor 134 provides energy to the sensor 112 during switching operations of the diode 171 and transistor 182.

Figure 7:
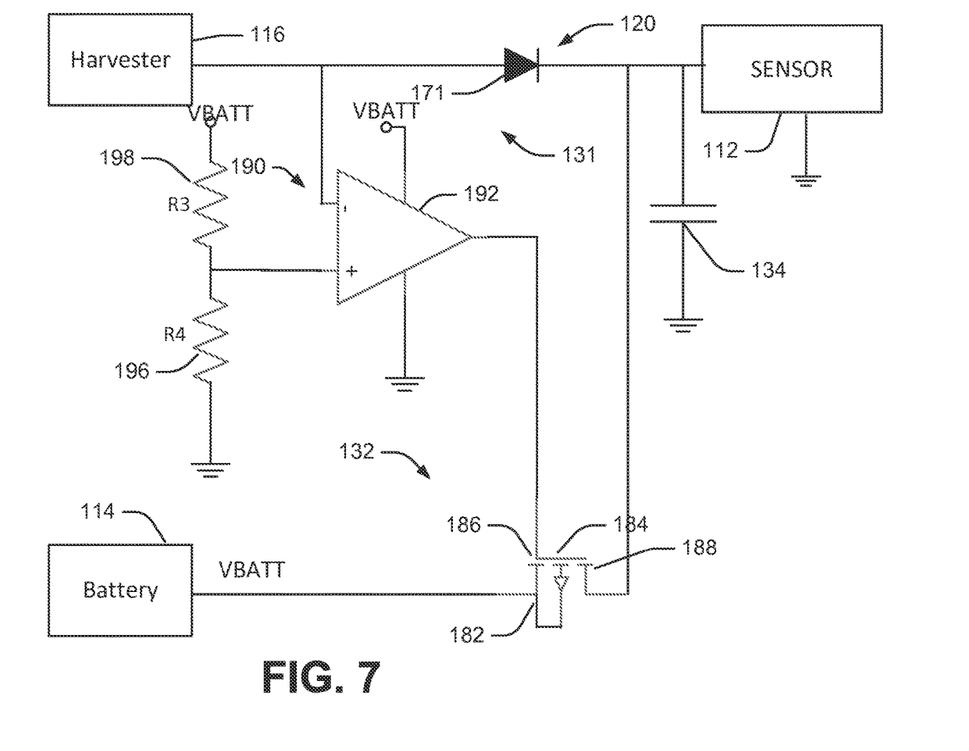

The example shown in FIG. 6 also provides a simple, small, low cost energy combiner 120, since only one diode 170 and one P-MOSFET 182 are used. Power loss across the P-MOSFET 182 is low or negligible, Another example is shown in FIG. 7, where a comparator 190 is configured to compare an output voltage of the energy harvester 116 with an output voltage of the battery 114. The comparator 190 includes an op-amp 182 that is connected between the output terminal of the energy harvester 116 and the gate terminal 184 of the transistor 182 to control a voltage applied to the gate terminal 182 in response to the comparison. In certain embodiments, the comparator 190 employs an ultra-low power op-amp 192 that controls the P-MOSFET 182 at desired threshold voltage levels. When the energy harvester 116 output voltage reaches a desired voltage level (voltage required to turn on the sensor 112), the op-amp 192 compares the energy harvester 116 voltage to the battery 114 voltage. Resistors 196, 198 provide a voltage divider used to set the threshold level. When the output of the energy harvester 116 crosses the threshold level, the op-amp 192 output turns off the P-MOSFET 182. Concurrently, the diode 171 turns on and provides the output of the energy harvester 116 to the sensor 112.

Figure 8:
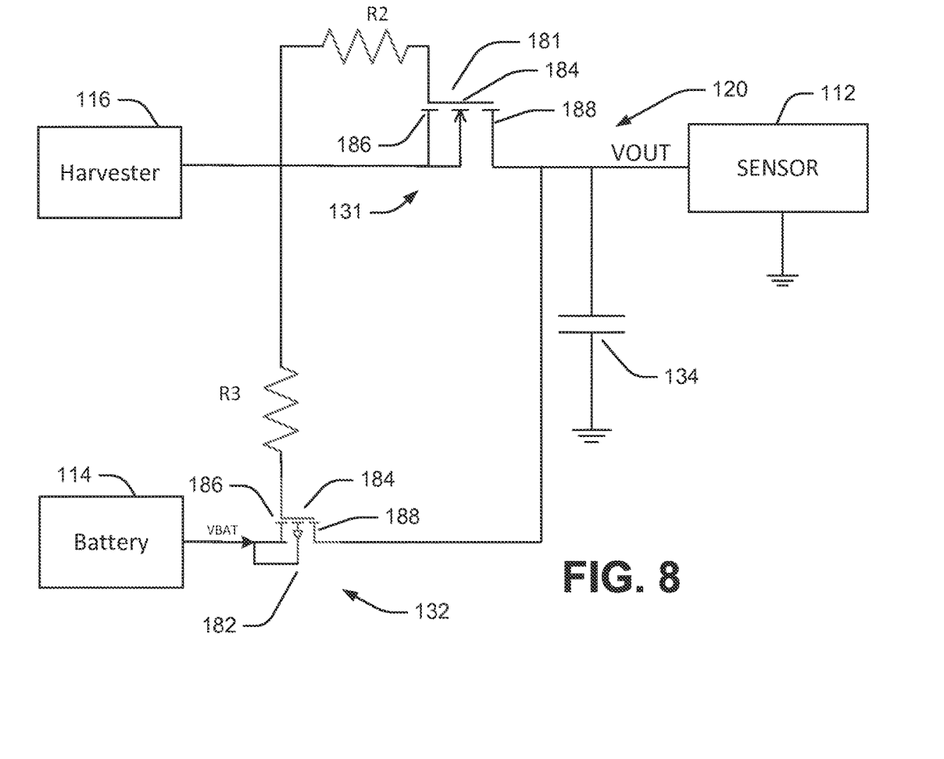

FIG. 8 illustrates another example of an energy combiner 120 where the first switch 131 includes a first transistor 181 having source and gate terminals 186, 184 connected to the output terminal of the energy harvester 116, and a drain terminal 188 connected to the sensor 112. In the embodiment shown in FIG. 8, the first transistor 191 is an N-MOSFET. The second switch 132 includes a second transistor 182 having a gate terminal 184 connected to the output terminal of the energy harvester 116, a source terminal 186 connected to the output terminal of the battery 114, and a drain terminal 88 connected to the sensor 114. The illustrated second transistor 182 is a P-MOSFET.

When the energy harvester 116 outputs energy it turns on the N-MOSFET 181 due to the voltage at the gate terminal 184 of the N-MOSFET 181. At essentially the same time, the P-MOSFET 182 turns off such that no energy is sourced from the battery 114 and the energy harvester 116 alone provides power to the sensor 112. When the energy harvester 116 is not producing sufficient energy, the P-MOSFET 182 turns on due to its zero gate voltage, and the N-MOSFET 181 remains in the off condition so that maximum energy is sourced to the sensor 112 by the battery 114.

Figure 9:
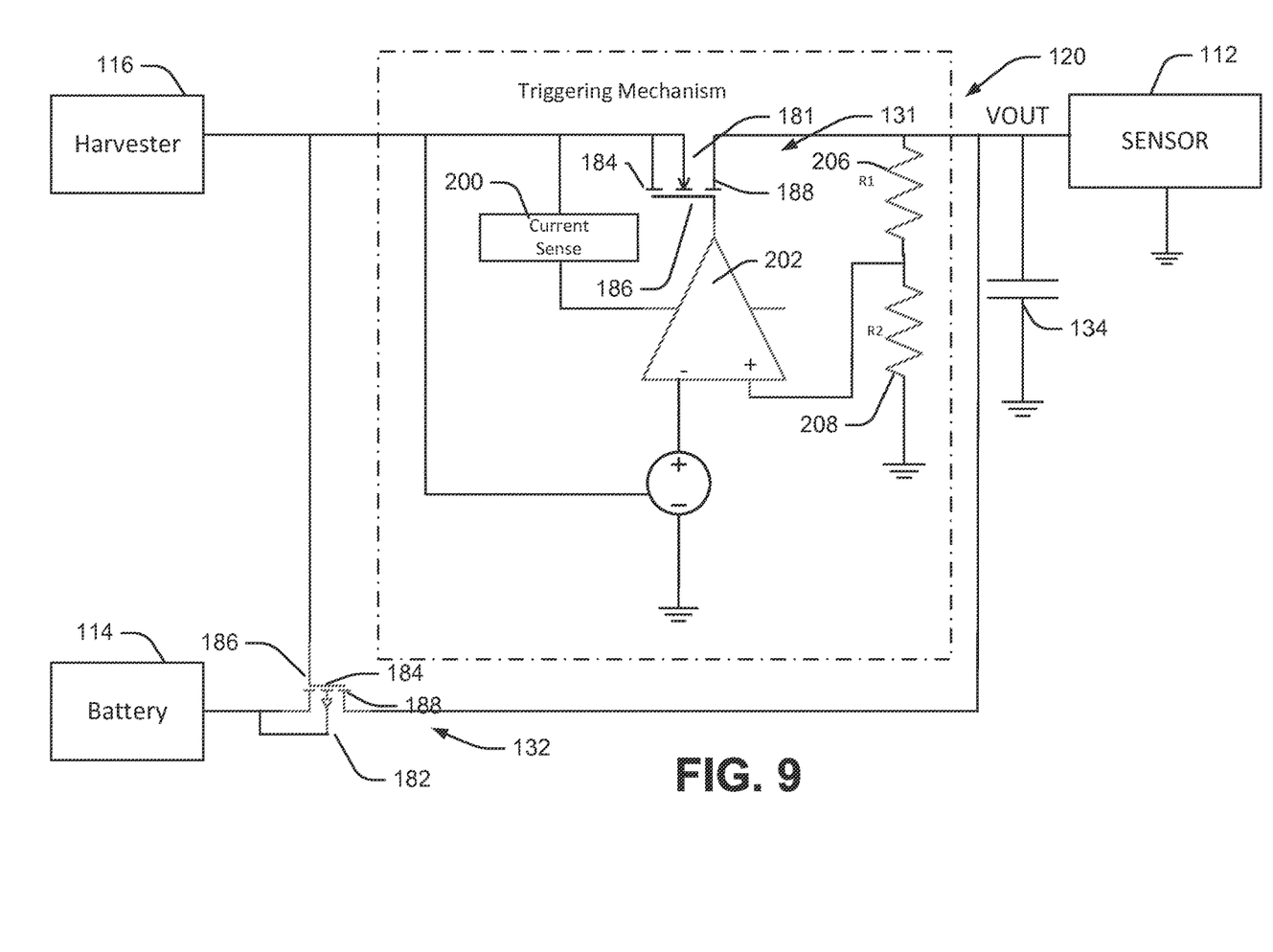

FIG. 9 illustrates another example that includes first and second transistors 181,182 (N-MOSFET and P-MOSFET, respectively), where the first transistor 181 is a component of a triggering mechanism that further includes a current sense arrangement 200 and an op-amp 202. When the energy harvester 116 outputs sufficient energy, the triggering mechanism conducts, causing the P-MOSFET 182 to turn off. In this condition, the energy harvester 116 sources energy to the sensor 112. The N-MOSFET 181 turns on when its gate voltage reaches a sufficient level. A voltage divider including resistors 206,208 provides feed back to the + input of the op-amp 200 to compare the output voltage of the first switch 131 with the input voltage and thus maintain a fixed output voltage. When the energy harvester 116 output drops below the predetermined level, the low voltage at the gate terminal 184 of the P-MOSFET 182 causes the P-MOSFET 182 to turn on and source energy from the battery 114 to the sensor 112.

Figure 10:
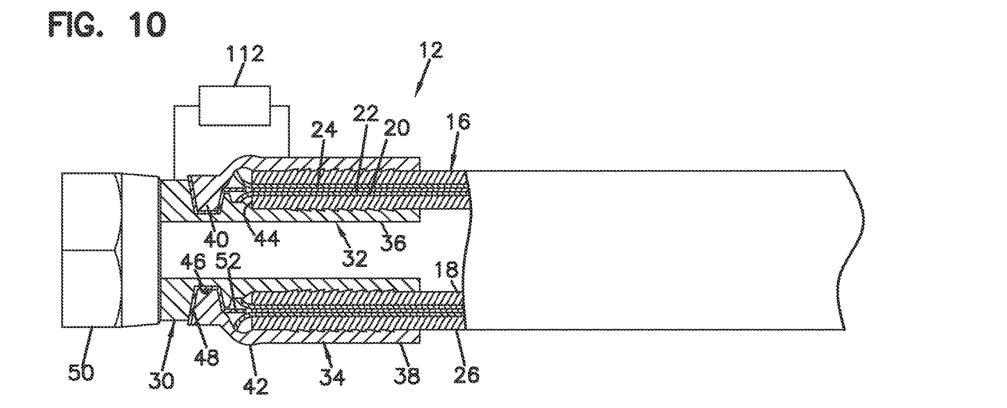
FIGS. 10-12 illustrate examples of a hose assembly in accordance with aspects of the present disclosure.
Figure 11:
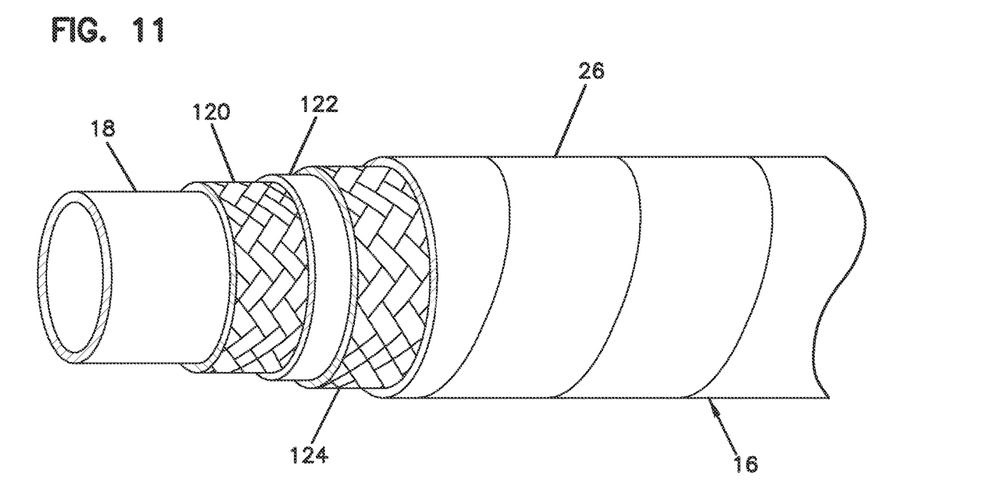
Figure 12:
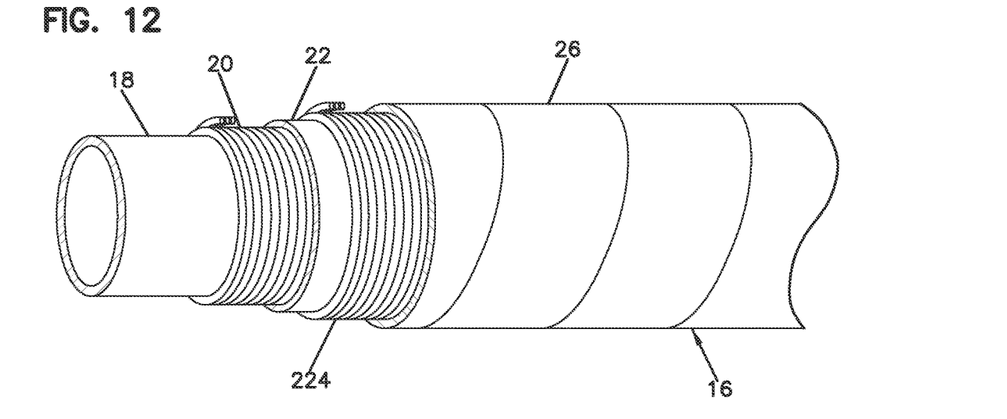

In some embodiments, the hydraulic component 110 monitored by the sensor 112 is a hydraulic hose assembly. FIGS. 10-12 illustrate an example of a hydraulic hose assembly 12 monitored in some implementations. The hose assembly 12 includes a hose 16 having a multi-layer construction. In the subject embodiment, the hose 16 is generally flexible and includes an inner tube 18 made from a polymeric material, such as rubber or plastic, or another material depending on the requirements of the particular application, a first conductive layer 20, an intermediate layer 22, a second conductive layer 24 and an outer cover 26. The first and second conductive layers 20, 24 define an electrical characteristic of the hose assembly 12, such as capacitance, inductance and/or resistance (impedance).

In the subject embodiment, the first conductive layer 20 overlays the inner tube 18 and the intermediate layer 22 overlays the first conductive layer 20. The second conductive layer 24 overlays the intermediate layer 22. The first and second conductive layers 20, 24 may be configured as reinforcing layers. The outer cover 26 may overlay the second conductive layer 24, and may include, for example, an extruded layer of rubber or plastic. The outer cover 26 may itself include a reinforcing layer.

The intermediate layer 22 operates to at least partially insulate electrically the first and second conductive layers 20, 24 from one another. The intermediate layer 22 may have any of a variety of constructions. For example, the intermediate layer 22 may consist of a single layer of an electrically resistive material. The intermediate layer 22 may also consist of multiple layers, wherein at least one of the layers exhibits electrical insulating properties. Certain composite materials may also be employed in the intermediate layer 22, such as a woven fabric bonded to a polymeric material. Composite materials having various other constructions may also be utilized. Composite materials may also be used in combination with other materials to form the intermediate layer 22.

The first and second conductive layers 20, 24 generally extend the entire length and span the entire circumference of the hose. This is generally the case when the conductive layer also functions as a reinforcement layer. The intermediate layer 22 may also extend over the entire length and circumference of the hose. There may be instances, however, where at least one of the first and second conductive layers 20, 24 extends only over a portion of the hose length and/or a portion of its circumference. In that instance, the intermediate layer 22 may also be configured to generally extend over the region of the hose containing the partial conductive layer 20, 24. The partial intermediate layer 22 may be positioned within the hose so as to separate the first and second conductive layers 20, 24 from one another.

The first and second conductive layers 20, 24 may include, for example, an electrically conductive braided reinforcement material, such as shown in FIG. 11, or alternating layers of electrically conductive spiral reinforcement material, such as shown in FIG. 12. The braided reinforcement material may consist of a single layer or may include multiple layers. Although a two-wire spiral reinforcement arrangement is depicted in FIG. 12, it shall also be appreciated that other configurations, such as four and six wire arrangements, may also be utilized.

The first and second conductive layers 20, 24 may each have the same configuration, or each layer may be configured differently. For example, the first and second conductive layers 20, 24 may each include the braided material shown in FIG. 11, or one of the first and second conductive layers 20, 24 may include the braided material while the other of the first and second conductive layers 20, 24 may include the spiral reinforcement material shown in FIG. 12. Additionally, the first and second conductive layers 20, 24 may include a single ply or multiple plies of reinforcement material. The first and second conductive layers 20, 24 may comprise metal wire, natural or synthetic fibers and textiles, and other reinforcement materials, provided the selected material is electrically conductive.

Referring to FIG. 10, the hose assembly 12 may include a hose fitting, generally designated 30, for fluidly coupling the hose 16 to another component. The hose fitting 30 may have any of a variety of different configurations depending, at least in part, on the requirements of the particular application.

In the subject embodiment, the hose fitting 30 includes a nipple, generally designated 32, that engages the inside of the hose 16 and a socket, generally designated 34, that engages the outside of the hose 16. The nipple 32 includes an elongated cylindrical end portion 36 that engages the inner tube 18 of the hose 16. A cylindrically shaped end portion 38 of the socket 34 engages the outer cover of the hose 16. The socket 34 and nipple 32 may be constructed from an electrically conductive material.

The socket 34 and nipple 32 can be secured to the hose 16 by crimping the end portion 38 of the socket 34 overlaying the hose 16. The crimping process deforms the end portion 38 of the socket 34, thereby compressing the hose 16 between the nipple 32 and the socket 34. In the subject embodiment, the portions of the nipple 32 and the socket 34 that engage the hose 16 include a series of serrations that at least partially embed into the relatively softer hose material when the socket 34 is crimped to help secure the hose fitting 30 to the hose 16. The serrations may be configured to prevent the serrations from penetrating the inner tube and outer cover and contacting the first and second conductive layers 20, 24.

In the subject embodiment, the socket 34 includes an inwardly extending circumferential lug 40 positioned near an end 42 of the socket 34 adjacent an end 44 of the hose 16. The lug 40 engages a corresponding circumferential slot 46 formed in the nipple 32 for securing the socket 34 to the nipple 32. The end 42 of the socket 34 having the fug 40 is initially formed larger than the nipple 32 to enable the socket 34 to be assembled onto the nipple 32. During the assembly process the end 42 of the socket 34 is crimped, which deforms the socket 34 and forces the lug 40 into engagement with the corresponding slot 46 in the nipple 32. The socket 34 can be electrically insulated from the nipple 32 by positioning an electrically insulating collar 48 between the socket 34 and nipple 32 at the point the lug 40 engages the slot 46.

The hose fitting 30 also includes a nut 50 rotatably attached to the nipple 32. The nut 50 provides a means for securing the hose assembly 12 to another component.

The first conductive layer 20 may be configured to extend beyond the end of the inner tube of the hose 16. The first conductive layer 20 may engage the nipple 32 to create an electrical connection between the nipple 32 and the first conductive layer 20. Similarly, the second conductive layer 24 may be configured to extend beyond an end of the outer cover of the hose 16. The second conductive layer 24 may engage the socket 34 to create an electrical connection between the socket 34 and the second conductive layer 24.

To help prevent the portions of the first and second conductive layers 20, 24 that extend beyond the end of the hose 16 from contacting one another, an electrically insulating spacer 52 may be positioned between the exposed ends of the first and second conductive layers 20, 24. The spacer 52 may be integrally formed as part of the collar 48 used to electrically insulate the socket 34 from the nipple 32. The spacer 52 may also be formed by extending the intermediate layer 22 of the hose 16 beyond an end of the inner tube 18 and outer cover 26. The spacer 52 may also be configured as a stand alone component separate from the collar 48 and the intermediate layer 22 of the hose 16.

The sensor 112 shown in FIG. 10 may have any of a variety of configurations. In general, the sensor 112 is connectable over a portion of the hose assembly 12, in particular the portion illustrated in FIG. 10. The sensor 112, when installed over hose assembly 12, fours a physical and electrical connection with the hose assembly 12, and in particular to nipple 32 and socket 34, respectively. Generally, the sensor 112 detects an electrical characteristic of the hose assembly 12, while validating the connection to the nipple 32 and socket 34.

Various types of energy harvesters 116 are employed in different embodiments. For example, a thermoelectric energy harvester is connected to a surface of the hydraulic component in some examples. The portion of the energy harvester 116 in contact with the component 116 receives heat from the hydraulic circuit 102. Another portion of the harvester 116 removed from the component 110 is cooler so that energy proportional to the temperature differential between the two portions of the energy harvester 116 is generated. In other embodiments, energy is harvested using piezoelectric devices including, for example, piezoelectric rings around the hose 16 shown in FIGS. 10-12, or in the flow path of the hydraulic circuit 102. Hydraulic fluid will exert pressure pulsations on the component. The pressure pulsation amplitude and frequency exerted will depend on the particular hydraulic application. Energy is harvested by the piezoelectric devices in response to the hydraulic fluid pressure pulsation amplitude and frequency.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A hydraulic system, comprising:
    a hydraulic circuit including a hydraulic component;
    a sensor for sensing a characteristic of the hydraulic component;
    an energy harvester configured to harvest energy from the hydraulic circuit;
    a battery; and
    an energy combiner receiving power outputs from the energy harvester and the battery, the energy combiner configured to selectively power the sensor
        from the battery alone in response to the output of the energy harvester being below a first predetermined level;
        from the battery and the energy harvester together in response to the output of the energy harvester being above the first predetermined level and below a second predetermined level that is higher than the first predetermined level; wherein the second predetermined level is a power on voltage of the sensor; and
        from the energy harvester alone in response to the output of the energy harvester being at or above the second predetermined level.

2. The hydraulic system of claim 1, wherein the energy combiner includes:
    a first switch connected between an output terminal of the energy harvester and the sensor; and
    a second switch connected between an output terminal of the battery and the sensor.

3. The hydraulic system of claim 2, wherein the first and second switches consist of respective first and second diodes.

4. The hydraulic system of claim 2, wherein:
    the first switch includes a diode having an anode connected to the output terminal of the energy harvester and a cathode connected to the sensor; and
    the second switch includes a transistor having a gate terminal connected to the output terminal of the energy harvester, a source terminal connected to the output terminal of the battery, and a drain terminal connected to the sensor.

5. The hydraulic system of claim 4, wherein the transistor is a P-MOSFET.

6. The hydraulic system of claim 4, further comprising a comparator configured to compare an output voltage of the energy harvester with an output voltage of the battery, wherein the comparator is connected between the output terminal of the energy harvester and the gate terminal of the transistor to control a voltage applied to the gate terminal in response to the comparison.

7. The hydraulic system of claim 2, wherein:
the first switch includes a first transistor having source and gate terminals connected to the output terminal of the energy harvester, and a drain terminal connected to the sensor; and
the second switch includes a second transistor having a gate terminal connected to the output terminal of the energy harvester, a source terminal connected to the output terminal of the battery, and a drain terminal connected to the sensor.

8. The hydraulic system of claim 7, wherein the first transistor is an N-MOSFET, and the second transistor is a P-MOSFET.

9. The hydraulic system of claim 2, further comprising a transition capacitor connected between the drain terminal and the sensor.

10. The hydraulic system of claim 1, wherein the battery is a non-rechargeable battery.

11. The hydraulic system of claim 1, wherein the energy harvester includes a plurality of energy harvesting devices of varying types.

12. The hydraulic system of claim 1, wherein the hydraulic component is a hose.

13. The hydraulic system of claim 1, further comprising a communication module configured to provide wireless communication to a receiver positioned remotely from the sensor, wherein the energy combiner is configured to power the communication module.

14. A hose assembly comprising:
a hose having a first conductive layer and a second conductive layer;
a sensor in electrical communication with the first and second conductive layers and configured to sense a characteristic of the hose;
an energy harvester in electrical communication with the sensor;
a battery in electrical communication with the sensor;
an energy combiner receiving power outputs from the energy harvester and the battery, the energy combiner configured to selectively power the sensor from the battery alone in response to the output of the energy harvester being below a first predetermined level, from the energy harvester alone in response to the output of the energy harvester being at or above a second predetermined level higher than the first predetermined level, and from the battery and the energy harvester together in response to the output of the energy harvester being below a power on voltage of the sensor.

15. The hose assembly of claim 14, further comprising a transition capacitor connected between the energy combiner and the sensor.

16. The hose assembly of claim 14, wherein the energy harvester includes a plurality of energy harvesting devices of varying types.

17. A method for monitoring a hydraulic component of a hydraulic circuit, comprising:
providing a hydraulic circuit including a hydraulic component;
situating a sensor to sense a characteristic of the hydraulic component of the hydraulic circuit;
harvesting energy from the hydraulic circuit including the hydraulic component; and
powering the sensor from a battery alone in response to the harvested energy being below a first predetermined level, from the harvested energy alone in response to the harvested energy being at or above a second predetermined level higher than the first predetermined level, and from the battery and the harvested energy together in response to the harvested energy harvester being below a power on voltage of the sensor.

* * * * *